(12) United States Patent
Duarte et al.

(10) Patent No.: US 9,849,620 B2
(45) Date of Patent: Dec. 26, 2017

(54) CONTAINER PREFORM

(71) Applicant: HUSKY INJECTION MOLDING SYSTEMS LTD., Bolton (CA)

(72) Inventors: Marco Duarte, Hagen (FR); Alaeddin Khalighi, Richmond Hill (CA); Marc Kleifges, Wittlich (DE); Thomas Zeiler, Wittlich (DE); Peter Gratz, Merzig (DE); Christophe Simon Pierre Beck, Saarlouis (DE)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 588 days.

(21) Appl. No.: 14/549,757

(22) Filed: Nov. 21, 2014

(65) Prior Publication Data

US 2015/0266229 A1 Sep. 24, 2015

(30) Foreign Application Priority Data

Mar. 21, 2014 (CN) .................... 2014 2 0132549 U
Sep. 5, 2014 (CN) .................... 2014 2 0513639 U

(51) Int. Cl.
*B29C 49/00* (2006.01)
*B29B 11/14* (2006.01)
*B29K 105/00* (2006.01)
*B29L 31/00* (2006.01)
*B29C 49/06* (2006.01)

(52) U.S. Cl.
CPC .......... *B29C 49/0073* (2013.01); *B29B 11/14* (2013.01); *B29B 2911/1464* (2013.01); *B29B 2911/14486* (2013.01); *B29B 2911/14886* (2013.01); *B29C 49/06* (2013.01); *B29K 2105/253* (2013.01); *B29L 2031/7158* (2013.01); *Y10T 428/13* (2015.01)

(58) Field of Classification Search
CPC .......... B29B 11/14; B29B 2911/14486; B29B 2911/1464; B29B 2911/14886; B29C 49/0073; B29C 49/06; B29K 2105/253; B29L 2031/7158; Y10T 428/13
See application file for complete search history.

(56) References Cited

U.S. PATENT DOCUMENTS

| 5,888,598 A | 3/1999 | Brewster et al. |
| 6,521,159 B1 | 2/2003 | Rashid et al. |
| 6,598,755 B1 | 7/2003 | Pedulla et al. |
| D571,220 S | 6/2008 | Pagliacci |

(Continued)

FOREIGN PATENT DOCUMENTS

| CN | 101522385 A | 9/2009 |
| CN | 201703613 U | 1/2011 |

(Continued)

*Primary Examiner* — Yan Lan

(57) ABSTRACT

Described herein, amongst other things, is a container preform that is blow moldable into a container. The container preform includes a tubular body having a neck finish and a base at an open end and a closed end thereof respectively. The base is defined between inside and outside curved surfaces at least one of which is composed of multiple tangential curves, wherein an elongate portion is defined between adjacent inside and outside concentric curves that define a thinnest bottom wall thickness of the base having a constant minimum thickness that is smaller than or equal to a wall thickness of the body.

4 Claims, 3 Drawing Sheets

(56) References Cited

U.S. PATENT DOCUMENTS

| | | | |
|---|---|---|---|
| D584,954 S | 1/2009 | Pagliacci | |
| 8,597,748 B2 | 12/2013 | Kelley et al. | |
| 2007/0000859 A1 | 1/2007 | Pedulla et al. | |
| 2009/0223920 A1 | 9/2009 | Patel et al. | |
| 2010/0055369 A1 | 3/2010 | Kelley et al. | |
| 2010/0081003 A1 | 4/2010 | Pagliacci | |
| 2013/0147097 A1* | 6/2013 | Lane | B29C 49/0073 264/524 |
| 2014/0030461 A1* | 1/2014 | Bunel | B65D 1/0276 428/36.92 |

FOREIGN PATENT DOCUMENTS

| | | |
|---|---|---|
| CN | 201728794 U | 2/2011 |
| CN | 102245366 A | 11/2011 |
| CN | 202670213 U | 1/2013 |
| CN | 103492142 A | 1/2014 |
| DE | 19907387 A1 | 8/2000 |
| DE | 10234037 A1 | 2/2004 |
| DE | 102012004613 A1 | 7/2013 |
| EP | 0739703 B1 | 5/1997 |
| EP | 0655306 B1 | 12/1999 |
| EP | 1029645 A1 | 8/2000 |
| EP | 0720905 B1 | 3/2001 |
| EP | 1262132 A1 | 12/2002 |
| EP | 1710166 A2 | 10/2006 |
| EP | 1893666 B1 | 10/2008 |
| EP | 2062711 A1 | 5/2009 |
| EP | 2263843 B1 | 7/2012 |
| EP | 2493671 B1 | 12/2013 |
| EP | 2496391 B1 | 12/2013 |
| FR | 2974070 * | 10/2012 |
| GB | 2048757 A | 12/1980 |
| WO | 1996024482 A1 | 8/1996 |
| WO | 9633857 A1 | 10/1996 |
| WO | 1997032711 A1 | 9/1997 |
| WO | 1997043104 A1 | 11/1997 |
| WO | 1997043108 A1 | 11/1997 |
| WO | 2001056896 A1 | 8/2001 |
| WO | 2006053261 A1 | 5/2006 |
| WO | 2007060529 A2 | 5/2007 |
| WO | 2007083266 A3 | 7/2007 |
| WO | 2008041186 A2 | 4/2008 |
| WO | 2008090437 A2 | 7/2008 |
| WO | 2009073473 A1 | 6/2009 |
| WO | 2009114405 A1 | 9/2009 |
| WO | 2010027667 A1 | 3/2010 |
| WO | 2010068607 A1 | 6/2010 |
| WO | 2011011149 A1 | 1/2011 |
| WO | 2011045739 A1 | 4/2011 |
| WO | 2011057036 A1 | 5/2011 |
| WO | 2011076301 A1 | 6/2011 |
| WO | 2012084995 A1 | 6/2012 |
| WO | 2012140343 A1 | 10/2012 |
| WO | 2013051601 A1 | 4/2013 |
| WO | 2014013470 A1 | 1/2014 |
| WO | 2014115074 A1 | 7/2014 |

* cited by examiner

CONTAINER PREFORM

CROSS REFERENCE TO RELATED APPLICATIONS

Foreign priority benefits are claimed under 35 U.S.C. §119(a)-(d) to Chinese Application No. 201420132549.1, filed Mar. 21, 2014 and to Chinese Application No. 201420513639.5, filed Sep. 5, 2014, each of which is hereby incorporated by reference in its entirety.

TECHNICAL FIELD

This relates to an improved container preform.

BACKGROUND

Plastic containers, such as a bottles for consumer beverages, are most commonly produced using an Injection Stretch Blow molding process. The process begins with the molding of a container preform (preform) using a molding process such as injection or compression molding. As need be, the preform is then transferred to a conditioning station for heating of parts thereof to be reshaped such that they become malleable and thus amenable to reshaping. Next, the preform is transferred into a blow mold for reshaping into the finished container. Blow molding typically involves the substantially simultaneously steps of axial and radial stretching of a body and base portion of the preform within a blow mold. Axial stretching of the preform is provided with extension of a stretch rod—mechanical stretching. Radial stretching of the preform is provided with pneumatic inflation with blowing of compressed air into the interior of the preform.

With reference to FIG. 1 below, a typical prior art preform 1 is depicted. The preform 1 comprises a generally tubular body 11 having a neck finish 10 and a base 12 at an open end and a closed end thereof respectively. The neck finish 10 forms part of the finished container and is configured to receive a closure (not shown) for capping thereof. A typical neck finish 10 includes one or more helical threads for coupling with complementary threads on the closure. The neck finish 10 also typically includes several outwardly depending rings that cooperate with anti-tamper features on the closure (i.e. pilfer ring) and for assisting in the handling and blow molding of the preform (i.e. support ledge/ring). The body 11 and base 12 of the preform 1 are the parts thereof that are reshaped in the stretch blow molding process to form the body of the container. The base 1 of the preform is typically hemispherical in shape forming a domed end. That is, the base has a hemispherical dome shape that is characterized by a generally spherical inside surface and outside surface each having a constant radius. A bottom wall thickness BWT of the base is fairly constant. The base also includes a small axially protruding gate vestige 13 that extends from a distal tip of the spherical base. The gate vestige 13 is a manufacturing artifact of the injection molding process by which the preform has been produced. The gate vestige is formed in the gate/sprue of the mold through which the molding material is injected into the molding cavity. Typically, the gate vestige is a short and narrow cylindrical feature that blends, along a small annular blending radius, onto an outside surface of the base 12.

SUMMARY

In accordance with an aspect disclosed herein, there is provided a container preform that includes a tubular body having a neck finish and a base at an open end and a closed end thereof respectively. The base is defined between inside and outside curved surfaces at least one of which is composed of multiple tangential curves, wherein an elongate portion is defined between adjacent inside and outside concentric curves that define a thinnest bottom wall thickness of the base having a constant minimum thickness that is smaller than or equal to a wall thickness of the body.

These and other aspects and features of non-limiting embodiments will now become apparent to those skilled in the art upon review of the following description of specific non-limiting embodiments in conjunction with the accompanying drawings.

DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting embodiment(s) of a container preform. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Figure 2:
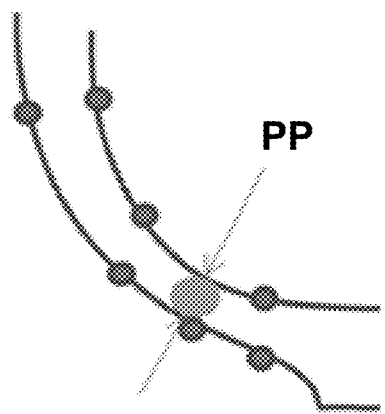
FIG. 2 depicts a base for a container preform of the prior art.

Various approaches are known to reduce the amount of molding material in container preforms. Many of these approaches relate to the base of the container preform. For example, it is known to provide a lightweight base having a non-hemispherical shape, such as, for example a conical or bullet shape (i.e. parabolic). The basis of some of these lightweight base designs involves a progressive variation or thinning of the wall in selected regions. An example of the foregoing is depicted with reference to FIG. 2. The foregoing base design is complicated to design and it includes a well-defined pinch point PP in the wall that may make the preform more difficult to mold.

Figure 3:
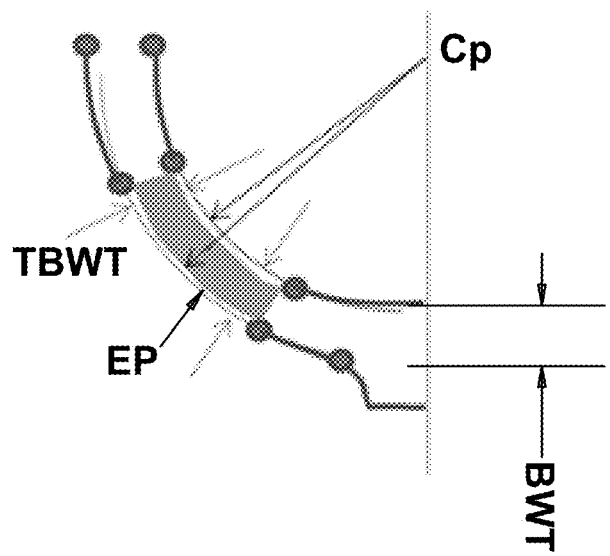
FIG. 3 depicts a schematic representation of an improved base for a container preform.

A schematic representation of an improved lightweight base for a container preform is shown with reference to FIG. 3. Like the prior art, the base may be defined between adjacent inside and outside curved surfaces at least one of which is composed of multiple tangential curves. What sets the improved base apart from the prior art is the provision of an elongate portion EP that is defined between inside and outside concentric curves (i.e. common center point Cp) that define a thinnest bottom wall thickness TBWT (i.e. minimum wall thickness of the base) having a constant minimum thickness that is smaller than or equal to the wall thickness WT of the body (FIG. 1) and possibly, but not necessarily, the bottom wall thickness BWT of the base 112. The elongate portion may be centrally located in the base or otherwise located closer to one of the body or the gate vestige. In so doing the improved base design defines a minimum thickness that is no longer a pinch point but rather an elongate portion of constant minimum thickness. A technical effect of the foregoing may include an improved blowing process window in comparison with non-spherical bases such as, for example, those having a generally conical shape.

Figure 1:
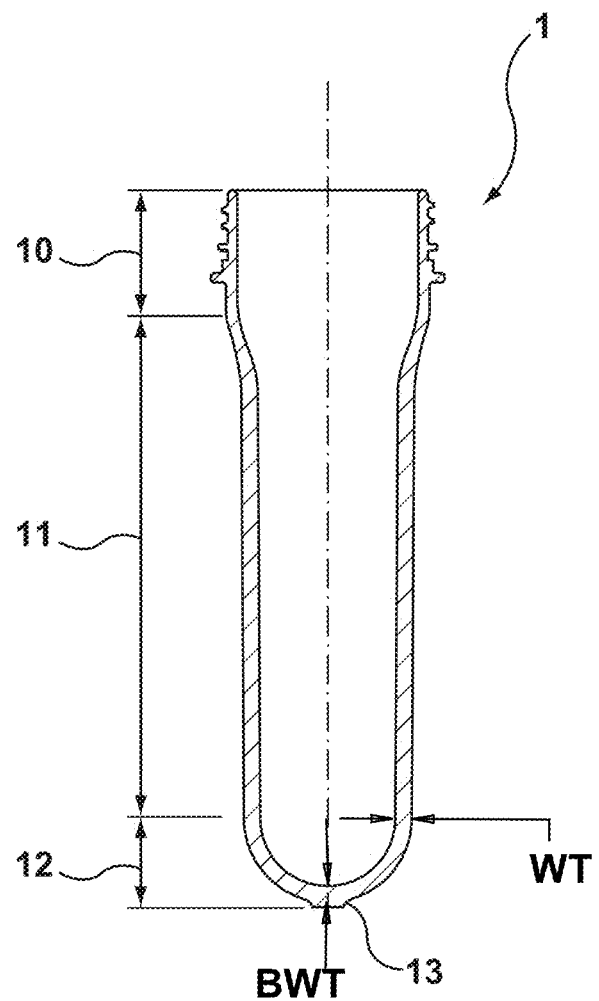
FIG. 1 depicts a container preform of the prior art.
Figure 4:
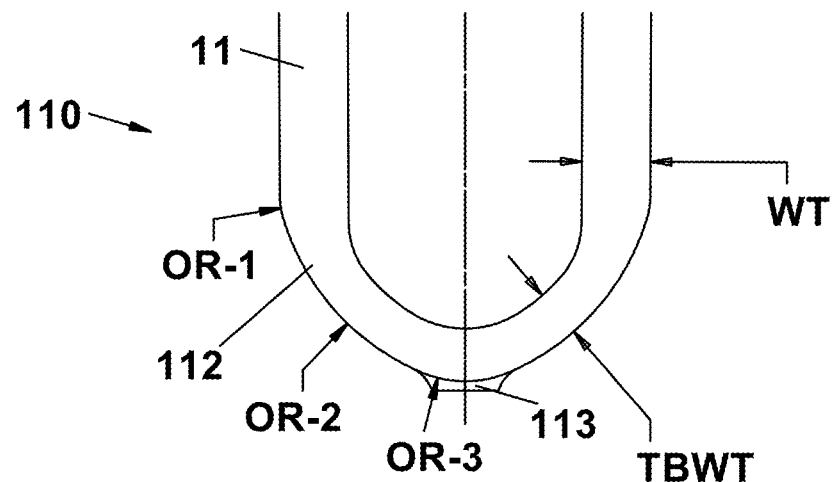
FIGS. 4 and 5 depict a base according to a non-limiting embodiment for use with the container preform of FIG. 1.
Figure 5:
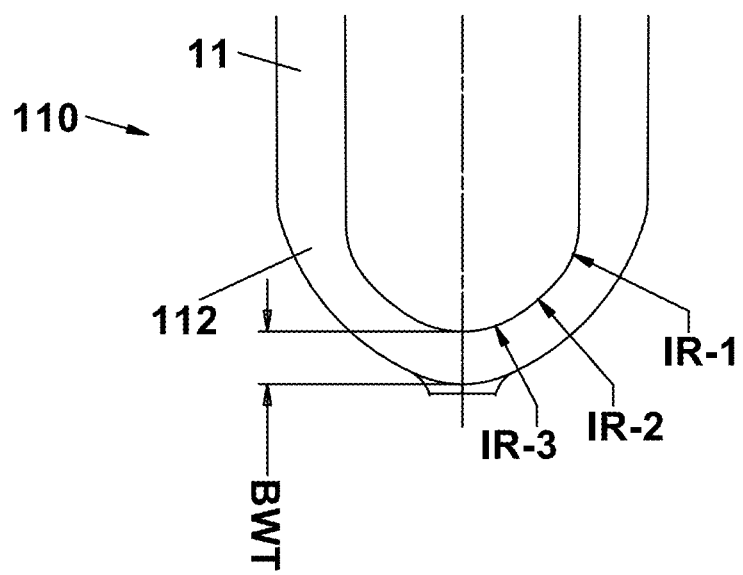

A non-limiting embodiment of a base 112 that is configured in accordance with the foregoing is shown with reference to FIGS. 4 and 5. While not shown, the base 112 may be incorporated into a container preform 110 like the preform 1 (FIG. 1). The base 112 has a 'bullet' shape that is visually parabolic that consists of inside and outside surfaces having compound curves (i.e. multiple tangential curves of different radii blended together). With reference to the FIG. 4 it may be appreciated that the outside surface of the base 112, disregarding the traditional gate vestige 113, is defined by three different outside curves of radii OR-1, OR-2, OR-3 that are tangential and have centers inside the preform. The first two outside curves of radii OR-1, OR-2, starting from the intersection of the base with the body 11 of the preform 110, have centers that may lie off of the center line of the preform, whereas the third curve of radius OR-3 has a center that lies on the center line of the preform 110. Similarly, with reference to the FIG. 5 it may be appreciated that the interior shape of the base is defined by three different interior curves of radii IR-1, IR-2, IR-3 that are tangential and have centers inside the preform. The first two inside curves of radii IR-1, IR-2, starting from the intersection of the base with the body of the preform, have centers that may lie off of the center line of the preform whereas the third inside curve of radius IR-3 has a center that lies on the center line of the preform 110. The radii of the inside and outside surfaces are selected to define a thinnest bottom wall thickness TBWT along a elongate portion between a central outside curve of radius OR-2 and a central inside curve of radius IR-2 that are concentric whereby the elongate portion has a constant minimum thickness that is less than or equal to the wall thickness WT of the base 11 and possibly, but not necessarily, the bottom wall thickness BWT of the base 112. A technical effect of the foregoing is less plastic in the base for economic and weight savings.

In accordance with an alternative non-limiting embodiment (not shown) the number of multiple curves (i.e. two or more) used to define the inside and outside surfaces of the base may be the same but need not be three as described previously. For example, using the same approach four, five, six or more curves may be used to define the inside and outside surfaces of the base 112 wherein two or more adjacent inside and outside curves are concentric and the radii thereof selected to define a thinnest bottom wall thickness (i.e. minimum thickness) therebetween that is less than or equal to the wall thickness of the body.

In accordance with another alternative non-limiting embodiment (not shown) the number of multiple curves used to define the inside surface may be larger than the number used to define the outside surface of the base. For example, the inside surface may be defined using two curves and the outside with one curve or similarly three inside curves and two outside curves, or four inside curves and three outside curves, or five inside curves and four outside curves and so forth, wherein two or more adjacent inside and outside curves are concentric and the radii thereof selected to define a thinnest bottom wall thickness (i.e. minimum thickness) therebetween that is less than or equal to the wall thickness of the body.

Conversely, in accordance with yet another alternative non-limiting embodiment (not shown) the number of multiple curves used to define the outside surface may be larger than the number used to define the inside surface of the base, wherein two or more adjacent inside and outside curves are concentric and the radii thereof selected to define a thinnest bottom wall thickness (i.e. minimum thickness) therebetween that is less than or equal to the wall thickness of the body.

The foregoing approach may be furthermore extended to a base that is defined with a single inside or outside curve and multiple outside or inside curves respectively.

Various embodiments having been thus described in detail by way of example, it will be apparent to those skilled in the art that variations and modifications may be made without departing from the invention. The invention includes all such variations and modifications as fall within the scope of the appended claims. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A container preform, comprising:
a tubular body having a neck finish and a base at an open end and a closed end thereof respectively;
the base is defined between inside and outside curved surfaces at least one of which is composed of multiple tangential curves, wherein an elongate portion is defined between adjacent inside and outside concentric curves that define a thinnest bottom wall thickness (TBWT) of the base having a constant minimum thickness that is smaller than or equal to a wall thickness of the body;
the number of multiple curves used to define the inside and outside surfaces of the base are the same;
the outside surface of the base, disregarding any gate vestige thereon, is defined by three different outside curves of radii that are tangential and have centers inside the preform, the first two outside curves of radii, starting from the intersection of the base with the body of the preform, have centers that may lie off of the center line of the preform, whereas the third curve of radius has a center that lies on the center line of the preform;

the interior shape of the base is defined by three different interior curves of radii that are tangential and have centers inside the preform, the first two inside curves of radii, starting from the intersection of the base with the body of the preform, have centers that may lie off of the center line of the preform whereas the third inside curve of radius has a center that lies on the center line of the preform;

wherein the radii of the inside and outside surfaces are selected to define the thinnest bottom wall thickness along the elongate portion thereof between a central outside curve of radius and a central inside curve of radius that are concentric.

2. The container preform of claim 1, wherein:

the elongate portion is equal to a bottom wall thickness of the base.

3. The container preform of claim 1, wherein:

the elongate portion is centrally located in the base.

4. The container preform of claim 1, wherein:

the elongate portion is located closer to one of the body or a gate vestige that is disposed at a tip of the base.

\* \* \* \* \*